Nov. 12, 1946.  E. GRONEMEYER ET AL  2,410,936
MOLDING PLASTIC HOLLOW BODIES
Filed March 29, 1945   2 Sheets-Sheet 1
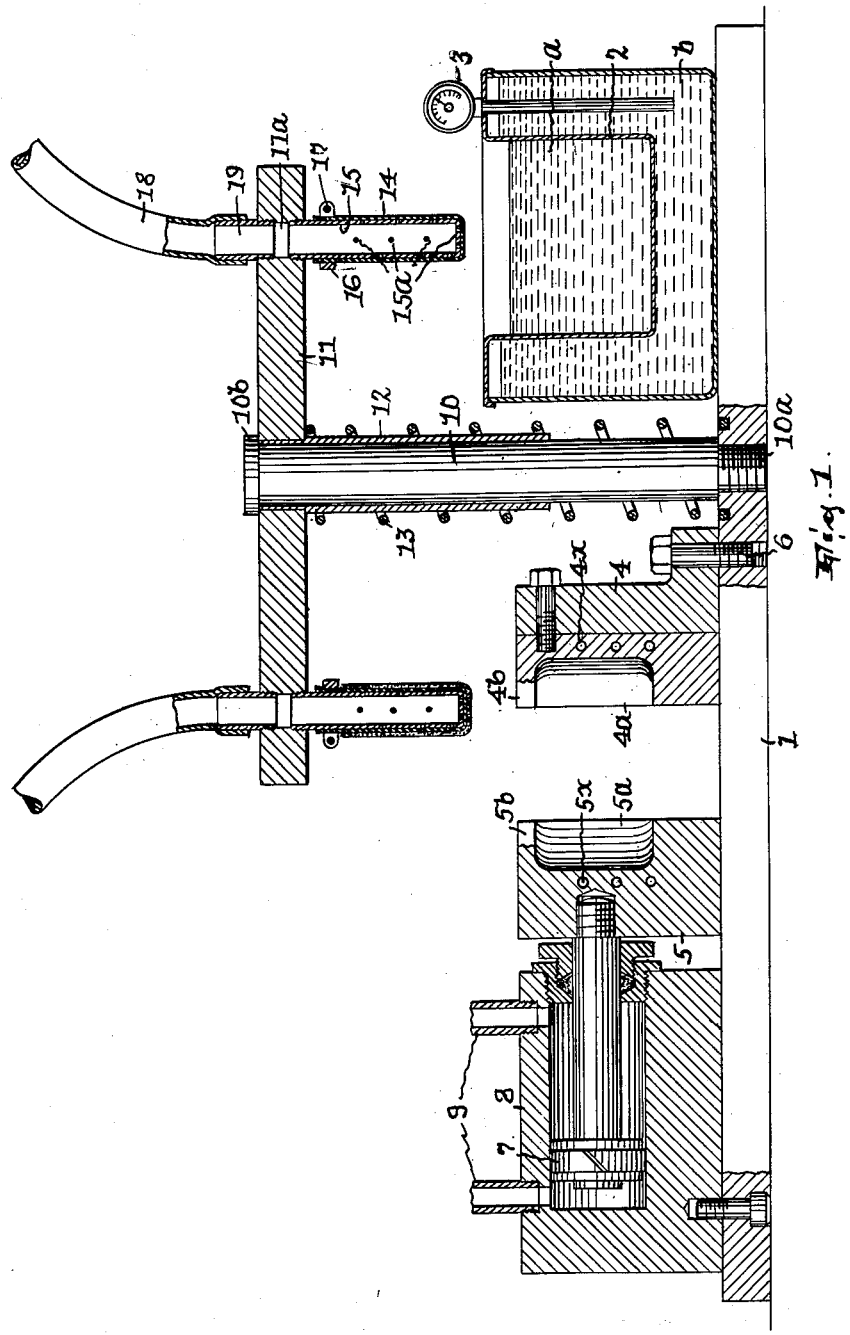
INVENTORS.
Erich Gronemeyer and
BY Samuel Cherba.
ATTORNEY

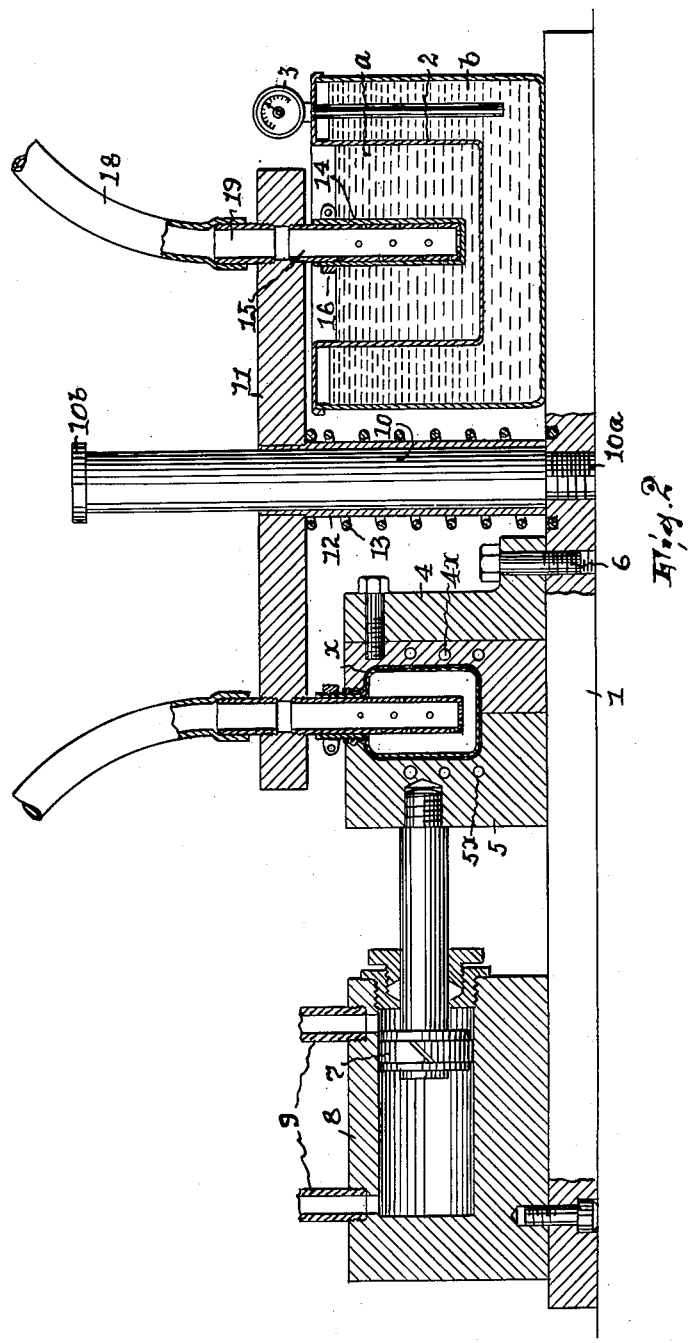

Patented Nov. 12, 1946

2,410,936

UNITED STATES PATENT OFFICE 2,410,936

MOLDING PLASTIC HOLLOW BODIES

Erich Gronemeyer, Pompton Plains, and Samuel Cherba, Totowa, N. J.

Application March 29, 1945, Serial No. 585,528

3 Claims. (Cl. 18—58)

This invention relates to the manufacture of hollow bodies and it consists in a novel method and a novel apparatus for forming such bodies when composed, say, of a plastic classed as either of the thermo-setting or thermoplastic type. According to the invention it is possible, as will appear, to produce hollow molded plastic bodies having quite little thickness, such a plastic as has been referred to being adapted to adhere to a core or form, dipped therein when the plastic is in liquid state, so as to exist only as a thin layer on such core or form when it is removed from the plastic and to cease to adhere thereto when the plastic is then permitted to assume the set state, or substantially so. For the molding said core or form is of the type which is hollow and is expansible in any way and preferably stretchable, as by being of rubber or equivalent elastic plastic, so as by fluid-inflation to increase its capacity. When in the appended claims we refer to the plastic used as settable we mean any plastic of the classes above referred to, to wit, which in liquid state will adhere, and on at least substantially setting will cease to adhere, to said core or form.

In the drawings, both views are generally vertical sectional views in a central plane, with parts of the apparatus used appearing in elevation.

Fig. 1 showing the carrier and its carried parts elevated; and

Fig. 2 showing such carrier and carried parts depressed.

Let 1 be a suitable base on which may be seated the container and mold.

The container here includes a container proper or well 2 in which is the plastic mass a, such container proper having a top opening or mouth as shown. The plastic is to exist in the container proper as a liquid and may be of the thermo-setting type (produced by chemical reaction as a liquid) or of the thermoplastic type, the former, once heated and solidified, being then permanently immune to liquidizing and the latter (normally existing as a solid) being repeatedly responsive to liquidizing by heat and solidifying by cooling. The container proper is surrounded by a space containing some medium, as a suitably heated liquid b, for heating the mass a; 3 is a thermostatic control for the means for heating the liquid b.

At 4—5 are the sections of the mold whose space, when the mold is closed, is formed by the recesses 4a—5a of the sections, such space having, in the closed state of the mold, an upwardly open mouth formed by extensions 4b—5b of said recesses. One mold section, as 4, is fixed to the base, as at 6, and the other slidable thereon toward and from section 4, as by fluid pressure active on a piston 7 in a cylinder 8 and admitted to either side of the piston by one or the other of pipes 9. At 4x—5x in the mold sections are ıssages for a cooling or heating fluid.

Set in the base, as by being screwed therein at 10a, is a vertical post 10 having an enlarged upper end 10b. And vertically movable on and rotative around the post is the mentioned carrier here comprising a head 11 and a depending sleeve 12 of appreciably less height than the post. The carrier is normally held abutting enlargement 10b by a helical spring 13 interposed between the base and head 10.

14 is the expansible core or form, here existing as a sac of some elastic stretchable plastic, as rubber, and in its normal or relaxed state being in this example of tubular form having one end closed and the other open. It is fitted to a depending tubular nozzle 15 of the carrier which has a port 11a that discharges to the nozzle (fitted into such port) and hence to the sac, the nozzle being here apertured in some way from its interior to its exterior, as by perforations 15a. A seal is formed between the nozzle and the sac above the apertured portion of the nozzle, as by a band 16 held in constricting relation to the sac by a bolt or screw 17. The means to discharge inflating fluid to and withdraw it from the sac includes a flexible hose 18, fitted to a nipple 19, itself fitted to port 11a of the carrier and to which hose a pressure pump, not shown, may be connected. Of course the container and the mold are so spaced from the axis of the carrier that the mouth of either, when the sac is in a plane radial of said axis and cutting such mouth, will be opposed to the sac. As will appear, the carrier is to be depressed to immerse the sac in the plastic in well 2 and then elevated to withdraw the sac from the plastic, then rotated to position the sac for entry to the mold, and again depressed and elevated, wherefore the well and mold should be at appropriate elevations for those purposes. In the example the set of parts 14 to 19 are shown duplicated and so positioned that when one set is depressed to enter the liquid in the well the other set enters the mold.

In operation, considering either set, with the same above the liquid plastic, the carrier is depressed to immerse the sac in the plastic, then allowed to rise, then turned to position such set, when the carrier is again depressed, for entry of the sac to the mold, assumed then to be in closed state with section 5 abutting section 4 or the mold may be open and closed after the carrier is depressed. The sac is then inflated by fluid admitted to nipple 14 via hose 18. The mold being at a suitable temperature the film of plastic adhering to the sac sets, whereupon, by withdrawing the inflating fluid, the sac collapses to its required or normal form, Fig. 1, and the carrier is allowed to rise, such rise preferably being effected while the mold remains closed so as not to disturb and perhaps damage the molded plastic product $x$ (Fig. 2) as might happen if the rise occurred with the mold open and so not confining such product. On opening the molded product may be removed.

Having thus fully described our invention what we claim is:

1. The method of forming a hollow plastic body which consists in immersing an expansible hollow core in a mass of settable plastic in liquid state which, on such immersion, will adhere to said core, then withdrawing the core from said mass and incorporating in a hollow mold a portion of the core having such plastic adhering thereto and expanding said portion to the form of the mold all before the plastic adhering to the core substantially sets, and, when the molded part of the plastic adhering to the core has so substantially set, separating the core, such molded part and mold from each other.

2. The method of forming a hollow plastic body which consists in immersing a fluid-inflatable core in a mass of settable plastic in liquid state which, on such immersion, will adhere to the core, then withdrawing the core from said mass and incorporating in a hollow mold a portion of the core having such plastic adhering thereto and inflating said portion to the form of the mold all before the plastic adhering to the core substantially sets, and, when the molded part of the plastic adhering to the core has so substantially set, deflating the core and removing the same from the mold and separating said part and the mold.

3. The method of forming a hollow plastic body which consists in immersing a fluid-inflatable elastic stretchable core in a mass of settable plastic in liquid state which, on such immersion, will adhere to said core, then withdrawing the core from said mass and incorporating in a hollow mold a portion of the core having such plastic adhering thereto and inflating and thereby stretching said portion until it conforms to the form of the mold all before the plastic adhering to the core substantially sets, and, when the molded part of the plastic adhering to the core has so substantially set, deflating the core and removing the same from the mold and separating said part and the mold.

ERICH GRONEMEYER.
SAMUEL CHERBA.